(12) United States Patent
Hosokawa et al.

(10) Patent No.: US 6,211,261 B1
(45) Date of Patent: Apr. 3, 2001

(54) THERMOSETTING PRESSURE-SENSITIVE ADHESIVE AND ADHESIVE SHEET THEREOF

(75) Inventors: Kazuhito Hosokawa; Masahiro Oura, both of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/400,181

(22) Filed: Sep. 21, 1999

(30) Foreign Application Priority Data

Sep. 24, 1998 (JP) .................................................. 10-268855

(51) Int. Cl.$^7$ ............................... C08F 2/50; C08L 33/06; C08L 63/00; C09J 133/06; C09J 163/00
(52) U.S. Cl. ............................... 522/36; 522/46; 522/129; 522/170; 522/182; 528/220; 528/405; 528/408; 528/421
(58) Field of Search ................................ 522/36, 46, 129, 522/170, 182; 528/220, 405, 408, 421

(56) References Cited

U.S. PATENT DOCUMENTS

| | | | |
|---|---|---|---|
| 3,617,362 | * | 11/1971 | Bemmels et al. . |
| 4,970,244 | * | 11/1990 | Komai et al. . |
| 5,086,088 | | 2/1992 | Kitano et al. . |
| 5,539,012 | * | 7/1996 | Klemarczyk et al. . |
| 5,883,193 | * | 3/1999 | Karim . |

FOREIGN PATENT DOCUMENTS 0 373 662 A2  6/1990 (EP) .
0 373 662 A3  6/1990 (EP) .

OTHER PUBLICATIONS

XP–002127948—Derwent Abstract (1992) of J04300981 (Oct. 1992).

* cited by examiner

Primary Examiner—Susan W. Berman
(74) Attorney, Agent, or Firm—Sughrue, Mion, Zinn Macpeak & Seas, PLLC

(57) ABSTRACT

A thermosetting pressure-sensitive adhesive which can obtain the high rate of polymerization without a decrease in the molecular weight by photopolymerization, thereby show the tackiness at ordinary temperatures to permit easy temporary adhesion to an adherend, can be cured by heating for a short period of time to exhibit strong adhesive strength and high heat resistance, and is excellent in storage stability before heating, comprising a photopolymerized product of a composition comprising a) 100 parts by weight of a monomer mixture comprising 70% to 99% by weight of an alkyl (meth)acrylate whose alkyl group has 2 to 14 carbon atoms on average, and 1% to 30% by weight of a monoethylenic unsaturated acid copolymerizable therewith based on the monomer mixture, b) 0.01 part to 20 parts by weight of a cleavage type photopolymerization initiator having 3 or more peroxide groups in its one molecule, c) 5 parts to 30 parts by weight of an epoxy resin, and not substantially containing a curing agent for the epoxy resin as ingredient (c).

12 Claims, No Drawings

THERMOSETTING PRESSURE-SENSITIVE ADHESIVE AND ADHESIVE SHEET THEREOF

FIELD OF THE INVENTION

The present invention relates to a thermosetting pressure-sensitive adhesive excellent in heat resistance which withstands the use thereof at a high temperature of 100° C. or more, or in a soldering process, and an adhesive sheet shaped in sheet or tape form comprising a base material having provided thereon the adhesive.

BACKGROUND OF THE INVENTION

For simplifying work and improving safety and sanitation, a process which comprises using a previously prepared adhesive sheet to effect adhesion treatment has been widely used instead of the conventional process which comprises applying and drying a liquid adhesive. As the adhesive sheet, a thermosetting adhesive sheet to be cured by heat treatment has been proposed in use for adhering electronic parts.

The conventional thermosetting adhesive sheet is excellent in adhesive strength and heat resistance, but poor in tackiness at room temperatures, resulting in the difficulty of positioning and temporarily adhering the sheet. Therefore, complicated treatments have been carried out, that is, the adhesive sheet is heated or swelled with a solvent to give tackiness thereto, followed by positioning and temporary adhesion. Furthermore, a low molecular weight ingredient not crosslinked is contained in a large amount before curing and this causes the problem of paste protrusion. Further, the conventional thermosetting adhesive sheets have disadvantages in that those excellent in storage stability take a lot of time for curing, and in that those curable for a short period of time is poor in storage stability.

On the other hand, a pressure-sensitive adhesive sheet has a tackiness at ordinary temperatures, can be adhered to an object without any previous operation, and can immediately exhibit the adhesive strength. However, the pressure-sensitive adhesive sheet has the disadvantage that it is generally poor in adhesive strength and heat resistance, compared with the adhesive. In JP-A-5-117593 (the term "JP-A" as used herein means an "unexamined published Japanese patent application"), strong adhesion and high heat resistance are realized by the use of a photopolymerizable composition containing an alkyl acrylate as the main ingredient. However, it does not exceed the level of the conventional pressure-sensitive adhesive sheet. That is, it has been desired to provide an adhesive sheet which can exhibit adhesion as the pressure-sensitive adhesive sheet at the beginning of adhesion to an adherend and can exhibit a high adhesion and a high heat resistance comparable to those of the adhesive after adhesion.

As a sheet which can meet this requirement, a so-called viscous adhesive, i.e., an adhesive having both characteristics of a pressure-sensitive adhesive and an adhesive has been proposed. For example, JP-A-2-272076 discloses a thermosetting pressure-sensitive adhesive in which a photopolymerizable composition obtained by adding an epoxy resin to an acrylic ester monomer is used as a raw material. Further, JP-A-7-2978 discloses a thermosetting pressure-sensitive adhesive in which a photopolymerizable composition obtained by adding an ester of an epoxy group-containing alcohol and (meth)acrylic acid and an epoxy resin to an alkyl (meth)acrylate is used as a raw material.

In the adhesives according to these proposals, the photopolymerizable compositions are photopolymerized by irradiation of ultraviolet rays to form the thermosetting adhesives having both characteristics of pressure-sensitive adhesives and adhesives. These compositions contain a curing agent such as imidazole, dicyandiamide, polyamines and phenol resin, and the curing reaction thereof with an epoxy group is conducted.

In this case, the curing reaction gradually proceeds in storage before or after photopolymerization to thereby deteriorate the adhesive characteristics, which raises a problem with regard to the storage stability. In particular, the adhesive disclosed in JP-A-2-272076 also has the problem that the acrylic polymer formed by photopolymerization is not crosslinked with the epoxy resin even after the curing reaction, resulting in insufficient heat resistance.

Further, when the photopolymerizable compositions of this kind each is provided on a base material and photopolymerized by irradiation of ultraviolet rays to prepare an adhesive sheet, even if the layer thickness of the photopolymerizable composition is increased for securing good adhesive strength, the rate of polymerization is not increased. As a result, unreacted monomers remain to cause inhospitable odors or the occurrence of foaming due to vaporization of the unreacted monomers. Further, in applications such as electronic parts, there is a possibility of bringing about corrosion of the electronic parts by vaporization of the residual monomers. Furthermore, when the amount of photopolymerization initiator is increased for increasing the rate of polymerization, the amount of unreacted monomers is decreased, but the resulting polymer has a reduced molecular weight to thereby cause a deteriorated heat resistance.

SUMMARY OF THE INVENTION

Contemplating such a situation, an object of the present invention is to provide a thermosetting pressure-sensitive adhesive which can exhibit a high rate of polymerization without a decrease in the molecular weight on photopolymerization, thereby can show the tackiness at ordinary temperatures to permit easy temporary adhesion to an adherend, can be cured by heating after that for a short period of time to exhibit strong adhesive strength and high heat resistance, and is scarcely cured during storage before heating, thus being excellent in storage stability.

Another object of the present invention is to provide a sheet-like or tape-like adhesive sheet thereof.

As a result of intensive studies for attaining the above-mentioned objects, the present inventors have discovered that the rate of polymerization can be increased without a decrease in the molecular weight by photopolymerizing an acrylic monomer with a specific photopolymerization initiator. Even when the layer thickness of a photopolymerizable composition is increased, the various disadvantages caused by unreacted monomers and the problem of deteriorated heat resistance due to a reduction in the molecular weight can be avoided, and when a specific monomer containing a carboxyl group in the molecule is added to this photopolymerization system and allowed to react with an epoxy resin after photopolymerization, the acrylic polymer after photopolymerization is crosslinked with the epoxy resin to exhibit strong adhesive strength and high heat resistance, and the adhesive before the above-mentioned reaction and after photopolymerization shows the tackiness at ordinary temperatures to permit temporary adhesion to an adherend, and can be cured by the above-mentioned reaction for a short period of time, and the adhesive is excellent in storage stability before the above-mentioned reaction, because a conventional curing agent such as imidazole, dicyandiamide, polyamine and a phenol resin is not incorporated.

That is to say, the present invention provides:

a thermosetting pressure-sensitive adhesive comprising a photopolymerized product of a composition comprising the following ingredients (a) to (c) and not substantially containing any curing agent for an epoxy resin as ingredient (c):

a) 100 parts by weight of a monomer mixture comprising 70% to 99% by weight of an alkyl (meth) acrylate whose alkyl group has 2 to 14 carbon atoms on average, and 1% to 30% by weight of a monoethylenic unsaturated acid copolymerizable therewith based on the monomer mixture;

b) 0.01 part to 20 parts by weight of a cleavage type photopolymerization initiator having 3 or more peroxide groups in its one molecule; and c) 5 parts to 30 parts by weight of an epoxy resin;

a sheet-like or tape-like adhesive sheet comprising a base material having provided on one side or both sides thereof the above-mentioned thermosetting pressure-sensitive adhesive layer or layers; and the above-mentioned adhesive sheet wherein the above-mentioned thermosetting pressure-sensitive adhesive layer has a thickness of 55 μm or more.

DETAILED DESCRIPTION OF THE INVENTION

The monomer mixture as ingredient (a) used in the present invention is a mixture of the alkyl (meth)acrylates and the monoethylenic unsaturated acids copolymerizable therewith. The former (meth)acrylic ester may be replaced by a vinyl monomer having no functional groups capable of reacting with the epoxy resin in an amount of 30% by weight or less of the amount allocated for (meth)acrylic ester (70 to 99% by weight of the monomer mixture). Examples of the vinyl monomer include vinyl acetate, styrene and acrylonitrile which are known as monomers for modifying general pressure-sensitive acrylic adhesives.

The alkyl (meth)acrylates include, for example, ethyl (meth)acrylate, n-butyl (meth)acrylate, 2-ethylhexyl (meth) acrylate, isooctyl (meth)acrylate and isononyl (meth) acrylate. From these, one or two or more of them are selected for use so that the alkyl groups each has 2 to 14 carbon atoms on average. The monoethylenic unsaturated acids copolymerizable therewith include, for example, (meth)acrylic acid, itaconic acid and 2-acrylamidopropanesulfonic acid.

In the monomer mixture as ingredient (a), with respect to the amounts of the alkyl (meth)acrylates and the monoethylenic unsaturated acids copolymerizable therewith, the former are used in an amount of 70% to 99% by weight, preferably 80% to 95% by weight, and the latter are used in an amount of 1% to 30% by weight, preferably 20% to 5% by weight, each based on the monomer mixture. Outside of the above-mentioned ranges, good results are difficult to be obtained in adhesive characteristics after the photopolymerization and epoxy curing reaction.

It is presumed that the cleavage type photopolymerization initiator having 3 or more peroxide groups in one molecule used as ingredient (b) in the present invention produces the above-mentioned many radicals in one molecule by the cleavage thereof, and that when a polymer molecule extends from one of these radical, polymer molecules also extend from other radicals in the same molecule, resulting in the formation of a three-dimensional polymer structure. Accordingly, even if the length from a reaction initiation point to a reaction termination point is the same as with the conventional photopolymerization initiators, a higher molecular weight is obtained as a whole because the three-dimensional polymer structure is present in the polymer molecule. This seems to increase the cohesive force without impairing the adhesive strength to obtain good results in heat resistance.

As such photopolymerization initiators, benzophenone group-containing polyvalent peroxyesters are preferably used. Specific examples thereof include 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra (cumylperoxycarbonyl)-benzophenone and 3,3',4,4'-tetra(p-isopropylcumylperoxycarbonyl)benzophenone.

The amount of such a photopolymerization initiator is generally from 0.01 part to 20 parts by weight, and preferably from 0.1 part to 3 parts by weight, per 100 parts by weight of monomer mixture as ingredient (a) described above. If the amount of the photopolymerization initiator is too small, the rate of polymerization is decreased because the initiator is consumed in the early stages. On the other hand, if the amount is too large, the rate of polymerization is increased, but the molecular weight is decreased to cause insufficient cohesive force. Thus, both the cases are unfavorable.

The epoxy resin used as ingredient (c) in the present invention include a compound having two or more epoxy groups in one molecule, and preferred examples thereof include bisphenol epoxy resins, phenolic epoxy resins and halogenated bisphenol epoxy resins. These epoxy resins contain no photopolymerizable groups in their molecules. The amount of the epoxy resin is generally from 5 parts to 30 parts by weight, and preferably from 5 parts to 20 parts by weight, per 100 parts by weight of monomer mixture as ingredient (a). If it is less than 5 parts by weight, progress of the crosslinking reaction of the acrylic polymer with the epoxy resin becomes insufficient to cause insufficient heat resistance. If it exceeds 30 parts by weight, excessive crosslinking of cured products is caused, thereby resulting in a peeling phenomenon on the surface of an adherend and a deteriorated storage stability.

The photopolymerizable composition of the present invention comprises the monomer mixture as ingredient (a), the photopolymerization initiator as ingredient (b) and the epoxy resin as ingredient (c) as essential ingredients, and may contain across linking agent, if necessary. However,in termes of handling, the monomer mixture as ingredient (a) can be preliminarily polymerized to some degree using a photopolymerization initiator other than the photopolymerization initiator as ingredient (b). As the use of the photopolymerization initiator as ingredient (b) in preliminary polymerization may cause a possibility of gelation, the photopolymerization initiator as ingredient (b) is preferably added after the preliminary polymerization.

Examples of the other photopolymerization initiator used herein include acetophenone initiators such as 4-(2-hydroxyethoxy)phenyl(2-hydroxy-2-propyl)ketone, 1-hydroxycyclohexyl phenyl ketone, 2-hydroxy-2,2-dimethylacetophenone, methoxyacetophenone and 2,2-dimethoxy-2-phenylacetophenone, benzoin ether initiators such as benzoin ethyl ether and benzoin isopropyl ether;

ketal initiators such as benzyl dimethyl ketal; ketone halides; acyl phosphinoxides; and acyl phosphonates. They may be used as a combination of two or more of them.

The crosslinking agent can be incorporated together with the photopolymerization initiator as ingredient (b) and the epoxy resins as ingredient (c) after the above-mentioned preliminary polymerization, if necessary, and examples of the crosslinking agent include bifunctional or more functional alkyl (meth)acrylate monomers known as multifunctional (meth)acrylates, for example, trimethylolpropane tri (meth)acrylate, pentaerythritol tetra(meth)acrylate, 1,2-ethylene glycol di(meth)acrylate, 1,6-hexanediol di(meth)acrylate and 1,12-dodecanediol di(meth)acrylate. The amount thereof is generally 5 parts by weight or less, and preferably 0.2 part to 3 parts by weight, per 100 parts by weight of the monomer mixture as ingredient (a), although it somewhat varies depending on the number of functional groups. The use of the crosslinking agent at such a rate can retain good cohesive force to give high heat resistance by the crosslinking effect to the acrylic polymer.

The photopolymerizable composition of the present invention may contain various known additives such as tackifiers, polar monomers, plasticizers, softeners, fillers, pigments, dyes and antioxidants as optional ingredients, in addition to the above-mentioned three ingredients a to c and crosslinking agents, as long as they do not inhibit photopolymerization to be caused by irradiation of ultraviolet rays. The total amount of these additives is generally 30 parts by weight or less based on 100 parts by weight of the monomer mixture.

General curing agents such as imidazole, dicyandiamide, polyamines and phenol resins known as the curing agents for epoxy resins can not be added as an optional ingredient to the photopolymerizable composition of the present invention. However, they may be incorporated as long as the crosslinking reaction with the epoxy resin does not substantially proceed and the incorporation of the curing agent causes no fear of significantly impairing the storage stability as one of the objects of the present invention. In the present invention, the terminology "not substantially containing a curing agent" has such a meaning.

The photopolymerizable composition is applied onto an adherend, or onto one side or both sides of a base material, followed by irradiation of an ultraviolet ray of about 400 mj/cm$^2$ to about 1,500 mj/cm$^2$ to photopolymerize it such that the rate of polymerization is generally 90% or more, thereby preparing a tackiness-imparted thermosetting pressure-sensitive acrylic adhesive itself having pressure-sensitive adhesive properties.

As the base material, a releasing base material such as release paper, as well as a non-releasing base material such as synthetic resin films including a polyester film (e.g., polyethylene terephthalate film) and fiber base materials, can be used. In the case of the releasing base material, the thermosetting pressure-sensitive adhesive layer provided thereon and photopolymerized may be transferred onto the above-mentioned non-releasing base material. The adhesive sheets of the present invention include both the sheets having the non-releasing base material and the sheets having the releasing base material as the base material.

With respect to the adhesive sheets, there is no particular limitation on the thickness of the thermosetting pressure-sensitive adhesive layer provided on the base material. However, for retaining good adhesive strength, it is usually 50 μm or more, preferably 55 μm or more, and more preferably 80 μm or more (usually, up to 400 μm).

In the present invention, the photopolymerizable composition contains the cleavage type photopolymerization initiator having 3 or more peroxide groups in one molecule as ingredient (b). Accordingly, even when the composition is applied so as to give a thick layer as described above after photopolymerization, the photopolymerization reaction can satisfactorily proceed due to the specific amount of the above-mentioned initiator, thereby increasing the rate of polymerization without a decrease in the molecular weight of the acrylic polymer.

The thermosetting pressure-sensitive acrylic adhesive comprising the photopolymerized product thus formed shows the tackiness at ordinary temperatures to permit easy temporary adhesion to an adherend, is cured for a short period of time by the reaction of the acrylic polymer with the epoxy resin by heating, and has strong adhesive strength and high heat resistance, and particularly withstands the use thereof at a high temperature of 100° C. or more or in a soldering process. Thus, the adhesive of the present invention exhibits excellent performances desired as the thermosetting pressure-sensitive adhesive. Moreover, the curing reaction scarcely proceeds in a state where the heat treatment is not applied yet, thus also being excellent in storage stability.

The present invention will be illustrated in greater detail with reference to the following examples. All parts are understood to be by weight below.

EXAMPLE 1

Into a four neck flask, 90 parts of isononyl acrylate, 10 parts of acrylic acid and 0.05 part of 2,2-dimethoxy-2-phenylacetophenone were put, and exposed to an ultraviolet ray in an atmosphere of nitrogen to partially conduct photopolymerization, thereby obtaining a syrup having a viscosity of about 30 poises. With 100 parts of this partially polymerized syrup, 0.2 part of trimethylolpropane triacrylate as a crosslinking agent, 0.4 part of 3,3',4,4'-tetra(t-butylperoxycarbonyl)benzophenone as a photopolymerization initiator and 20 parts of an epoxy resin (trade name: "Epikoat 828", manufactured by Yuka Shell Epoxy Kabushikikaisya) were homogeneously mixed to prepare a photopolymerizable composition. Then, this composition was applied onto a base material made of a 25-μm thick polyethylene terephthalate film to which a low adhesion-providing release treatment was applied, and irradiated with an ultraviolet ray of 900 mj/cm$^2$ to conduct photopolymerization, thereby forming a thermosetting pressure-sensitive adhesive layer having a thickness of 80 μm to prepare an adhesive tape.

EXAMPLE 2

An adhesive tape was prepared in the same manner as in Example 1 except that the thickness of the thermosetting pressure-sensitive adhesive layer was changed to 100 μm.

EXAMPLE 3

Into a four neck flask, 50 parts of isooctyl acrylate, 35 parts of butyl acrylate, 15 parts of acrylic acid and 0.05 part of 2,2-dimethoxy-2-phenylacetophenone were charged, and exposed to an ultraviolet ray in an atmosphere of nitrogen to partially conduct photopolymerization, thereby obtaining a syrup having a viscosity of about 30 poises. With 100 parts of this partially polymerized syrup, 0.3 part of 1,6-hexanediol diacrylate as a crosslinking agent, 0.1 part of 3,3',4,4'-tetra(t-butylperoxycarbonyl)benzophenone as a photopolymerization initiator and 10 parts of an epoxy resin (trade name: "Epikoat 815", manufactured by Yuka Shell Epoxy Kabushikikaisya) were homogeneously mixed to prepare a photopolymerizable composition. Using this photopolymerizable composition, an adhesive tape having a 100-μm thick thermosetting pressure-sensitive adhesive layer was prepared in the same manner as in Example 1.

COMPARATIVE EXAMPLE 1

A photopolymerizable composition was prepared in the same manner as in Example 1 except that 0.4 part of 2,2'-dimethoxy-2-phenylacetophenone was used in place of 0.4 part of 3,3',4,4'-tetra(t-butylperoxycarbonyl) benzophenone as a photopolymerization initiator added to 100 parts of the partially polymerized syrup, and using this photopolymerizable composition, an adhesive tape having a 80-μm thick thermosetting pressure-sensitive adhesive layer was prepared in the same manner as in Example 1.

COMPARATIVE EXAMPLE 2

A photopolymerizable composition was prepared in the same manner as in Example 3 except that 0.1 part of 2,2'-dimethoxy-2-phenylacetophenone was used in place of 0.1 part of 3,3',4,4'-tetra(t-butylperoxycarbonyl) benzophenone as a photopolymerization initiator added to 100 parts of the partially polymerized syrup, and using this photopolymerizable composition, an adhesive tape having a 100-μm thick thermosetting pressure-sensitive adhesive layer was prepared in the same manner as in Example 3.

COMPARATIVE EXAMPLE 3

A photopolymerizable composition was prepared in the same manner as in Example 1 except that 10 parts of N-vinylpyrrolidone was used in place of 10 parts of acrylic acid and 3 parts of dicyandiamide was added as a curing agent for the epoxy resin, and using this photopolymerizable composition, an adhesive tape having a 80-μm thick thermosetting pressure-sensitive adhesive layer was prepared in the same manner as in Example 1.

All of the above-mentioned adhesive tapes of Examples 1 to 3 and Comparative Examples 1 to 3 had tackiness at ordinary temperatures, and their positioning and temporary adhesion to adherends were easy. Further, for the respective adhesive tapes, the rate of polymerization after photopolymerization, the adhesion (90° peel adhesive strength) after heating and the heat resistance (solder heat resistance) were examined by the following methods. Results thereof are as shown in Table 1 given below.

Rate of Polymerization After Photopolymerization

About 2.0 g of the thermosetting pressure-sensitive adhesive was collected from the adhesive tape and precisely weighed. This was heated at 130° C. for 2 hours, and the weight thereof after heating was measured. Then, the rate of polymerization after photopolymerization was calculated according to the following equation:

Rate of polymerization=(Weight after heating/Weight before heating)×100 (%)

Adhesion

The adhesive tape was laminated with a polyimide film ("Upilex 75S" manufactured by Ube Industries Ltd.) under pressing conditions of 200° C., 1 MPa and 1 second and under curing conditions of 150° C. and 2 hours, and the 90° peel adhesive strength was examined.

Heat Resistance

After removing the base material, the thermosetting pressure-sensitive adhesive layer of each adhesive tape was allowed to intervene between SUS 304 (stainless steel specified in Japanese Industrial Standard) and a polyimide film, and laminated therewith under pressing conditions of 200° C., 1 MPa and 1 second and under curing conditions of 150° C. and 2 hours, and the resulting laminate was floated on a solder bath of 260° C. for 30 seconds with the the polyimide film face being upward. After this treatment, the laminated state of both described above was visually observed. One in which neither foaming of the adhesive nor abnormal adhesion (floating, wrinkles, separation and displacement) was observed was evaluated as "A", and one in which either the above-mentioned foaming or abnormal adhesion was clearly observed was evaluated as "B".

TABLE 1

|  | Rate of Polymerization (%) | Adhesion (g/cm) | Heat Resistance |
| --- | --- | --- | --- |
| Example 1 | 99.0 | 1,500 | A |
| Example 2 | 98.4 | 2,000 | A |
| Example 3 | 98.6 | 1,800 | A |
| Comparative Example 1 | 98.0 | 1,100 | B |
| Comparative Example 2 | 97.1 | 1,600 | B |
| Comparative Example 3 | 98.9 | 1,400 | B |

Results of Table 1 described above indicate that the respective adhesive tapes of Examples 1 to 3 give high 90° peel adhesive strength and good solder heat resistance after heating, because the high rate of polymerization is obtained without a reduction in the molecular weight by photopolymerization. In contrast, the adhesive tape of Comparative Example 1 is high in the rate of polymerization after photopolymerization, but low in the molecular weight of the polymer produced. Accordingly, it is poor in the above-mentioned adhesive strength and solder heat resistance. The adhesive tape of Comparative Example 2 is decreased in the rate of polymerization after photopolymerization, resulting in unsatisfactory solder heat resistance. Further, in the adhesive tape of Comparative Example 3, the acrylic polymer and the epoxy resin are not crosslinked even after curing by heating, so that the solder heat resistance is insufficient.

Then, for the respective adhesive tapes of Examples 1 to 3 and Comparative Example 3, the adhesive strength and the heat resistance were examined in the same manners as described above after storage in the atmosphere of 23° C. and 65% RH for 90 days, as storage stability tests. As a result, the respective adhesive tapes of Examples 1 to 3 scarcely changed in both the above-mentioned characteristics from those before storage. However, the adhesive tape of Comparative Example 3 was largely deteriorated in the adhesion, to say nothing of the heat resistance, so that it could not be used.

As described above, the present invention can provide the thermosetting adhesives and the adhesive sheets thereof which can increase the rate of polymerization without a decrease in the molecular weight, which allows the various conventional disadvantages caused by unreacted monomers and the problem of deteriorated heat resistance due to a reduction in the molecular weight to be avoided, show the tackiness at ordinary temperatures to permit easy temporary adhesion to adherends, after the above-mentioned photopolymerization, besides, exhibit strong adhesive strength and high heat resistance by curing for a short period of time due to the reaction of the acrylic polymer with the epoxy resin by heating after that, particularly give the heat resistance withstanding the use thereof at a high temperature of 100° C. or more or in a soldering process, and show the excellent storage stability, i.e., the curing reaction scarcely proceeds during storage before heating, by adding a monoethylenic unsaturated acid, a cleavage type photopolymerization initiator having 3 or more peroxide groups in its one molecule and an epoxy resin to an alkyl (meth)acrylate, and photopolymerizing them.

While the invention has been described in detail and with reference to specific embodiments thereof, it will be apparent to one skilled in the art that various changes and modifications can be made therein without departing from the spirit and scope thereof.

What is claimed is:

1. A thermosetting pressure-sensitive adhesive comprising a photopolymerized product of a composition comprising the following ingredients (a) to (c) and not substantially containing a curing agent for the epoxy resin as ingredient (c):
    a) 100 parts by weight of a monomer mixture comprising 70% to 99% by weight of an alkyl (meth) acrylate whose alkyl group has 2 to 14 carbon atoms on average and 1% to 30% by weight of a monoethylenic unsaturated acid copolymerizable therewith based on the monomer mixture;
    b) 0.01 part to 20 parts by weight of a cleavage photopolymerization initiator having 3 or more peroxide groups in its one molecule; and
    c) 5 parts to 30 parts by weight of an epoxy resin.

2. The thermosetting pressure-sensitive adhesive of claim 1, wherein the alkyl (meth)acrylate is at least one selected from the group consisting of ethyl (meth)acrylate, n-butyl (meth)acrylate, 2-ethylhexyl (meth)acrylate, isooctyl (meth)acrylate and isononyl (meth)acrylate.

3. The thermosetting pressure-sensitive adhesive of claim 1, wherein the monoethylenic unsaturated acid is at least one selected from the group consisting of (meth)acrylic acid, itaconic acid and 2-acrylamidopropanesulfonic acid.

4. The thermosetting pressure-sensitive adhesive of claim 1, wherein the cleavage type photopolymerization initiator is at least one selected from the group consisting of from 3,3',4,4'-tetra(t-butyl-peroxycarbonyl)benzophenone, 3,3',4,4'-tetra(t-amylperoxy-carbonyl)benzophenone, 3,3',4,4'-tetra(t-hexylperoxy-carbonyl)benzophenone, 3,3',4,4'-tetra(t-octylperoxy-carbonyl)benzophenone, 3,3',4,4'-tetra(cumylperoxycarbonyl)-benzophenone and 3,3',4,4'-tetra(p-isopropylcumylperoxy-carbonyl)benzophenone.

5. The thermosetting pressure-sensitive adhesive of claim 1, wherein the epoxy resin is at least one selected from the group consisting of a bisphenol epoxy resin, a phenolic epoxy resin and a halogenated bisphenol epoxy resin.

6. An adhesive sheet comprising a base material having provided on one side or both sides thereof at least one layer made from a thermosetting pressure-sensitive adhesive comprising a photopolymerized product of a composition comprising the following ingredients (a) to (c) and not substantially containing a curing agent for the epoxy resin as ingredient (c):
    a) 100 parts by weight of a monomer mixture comprising 70% to 99% by weight of an alkyl (meth)acrylate whose alkyl group has 2 to 14 carbon atoms on average and 1% to 30% by weight of a monoethylenic unsaturated acid copolymerizable therewith based on the monomer mixture;
    b) 0.01 part to 20 parts by weight of a cleavage photopolymerization initiator having 3 or more peroxide groups in its one molecule; and
    c) 5 parts to 30 parts by weight of an epoxy resin.

7. The adhesive sheet according to claim 6, wherein the thermosetting pressure-sensitive adhesive layer has a thickness of 50 to 400 $\mu$m.

8. The adhesive sheet according to claim 6, wherein the thermosetting pressure-sensitive adhesive layer has a thickness of 55 $\mu$m or more.

9. The adhesive sheet of claim 6, wherein the alkyl (meth)acrylate is at least one selected from the group consisting of ethyl (meth)acrylate, n-butyl (meth)acrylate, 2-ethylhexyl (meth)acrylate, isooctyl (meth)acrylate and isononyl (meth)acrylate.

10. The adhesive sheet of claim 6, wherein the monoethylenic unsaturated acid is at least one selected from the group consisting of (meth)acrylic acid, itaconic acid and 2-acrylamidopropanesulfonic acid.

11. The adhesive sheet of claim 6, wherein the cleavage type photopolymerization initiator is at least one selected from the group consisting of from 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra (cumylperoxycarbonyl)benzophenone and 3,3',4,4'-tetra(p-isopropylcumylperoxycarbonyl)benzophenone.

12. The adhesive sheet of claim 6, wherein the epoxy resin is at least one selected from the group consisting of a bisphenol epoxy resin, a phenolic epoxy resin and a halogenated bisphenol epoxy resin.

* * * * *